(12) United States Patent
Li et al.

(10) Patent No.: US 12,326,635 B2
(45) Date of Patent: Jun. 10, 2025

(54) DISPLAY SUBSTRATE, DISPLAY PANEL, AND NEAR-EYE DISPLAY DEVICE AND DISPLAY METHOD THEREOF

(71) Applicant: BOE Technology Group Co., Ltd., Beijing (CN)

(72) Inventors: Shipei Li, Beijing (CN); Qi Yao, Beijing (CN); Ying Zhao, Beijing (CN); Wei He, Beijing (CN); Huili Wu, Beijing (CN); Sheng Xu, Beijing (CN); Wusheng Li, Beijing (CN); Guangcai Yuan, Beijing (CN); Xue Dong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/022,121

(22) PCT Filed: Mar. 16, 2022

(86) PCT No.: PCT/CN2022/081251
§ 371 (c)(1),
(2) Date: Feb. 17, 2023

(87) PCT Pub. No.: WO2023/173334
PCT Pub. Date: Sep. 21, 2023

(65) Prior Publication Data
US 2024/0272495 A1    Aug. 15, 2024

(51) Int. Cl.
G02F 1/1343    (2006.01)
G02F 1/1333    (2006.01)
G02F 1/13357   (2006.01)

(52) U.S. Cl.
CPC .... *G02F 1/13439* (2013.01); *G02F 1/133388* (2021.01); *G02F 1/133615* (2013.01); *G02F 1/134309* (2013.01)

(58) Field of Classification Search
CPC .......... G02F 1/13439; G02F 1/133388; G02F 1/133615
See application file for complete search history.

(56) References Cited

U.S. PATENT DOCUMENTS

2009/0160732 A1\*  6/2009  Kimura .................. B60K 35/00
                                                    340/425.5
2010/0041177 A1    2/2010  Yang et al.
(Continued)

FOREIGN PATENT DOCUMENTS

CN         101548407 B      1/2011
CN         205657058 U     10/2016
(Continued)

*Primary Examiner* — Lucy P Chien
(74) *Attorney, Agent, or Firm* — IPro, LLC

(57) ABSTRACT

The display substrate includes a base substrate (101) including a display area (AA) and a peripheral area (BB) on at least one side of the display area (AA); and an infrared sensor (102) on the base substrate (101). The infrared sensor (102) is integrated in the peripheral area (BB). The infrared sensor (102) includes a first electrode (1021), a photoelectric conversion function layer (1022) and a second electrode (1023) that are arranged in a stacked manner. The first electrode (1021) is arranged adjacent to the base substrate (101), the second electrode (1023) is made of a transparent conductive material, and the infrared sensor (102) collects infrared rays reflected by an eye from a side where the second electrode (1023) is located.

17 Claims, 12 Drawing Sheets

(56) References Cited

U.S. PATENT DOCUMENTS

| | | | | |
|---|---|---|---|---|
| 2013/0115423 A1* | 5/2013 | Li | ............................ | C08J 7/046 |
| | | | | 428/218 |
| 2015/0096610 A1* | 4/2015 | Okubo | ................... | H10K 30/50 |
| | | | | 136/263 |
| 2018/0277033 A1 | 9/2018 | Jia et al. | | |

FOREIGN PATENT DOCUMENTS

| | | |
|---|---|---|
| CN | 212694165 U | 3/2021 |
| CN | 113359292 A | 9/2021 |
| CN | 113655649 A | 11/2021 |
| KR | 100671645 B1 | 1/2007 |

\* cited by examiner

| Second electrode 1023 | |
|---|---|
| Hole transport layer 10223 | |
| Organic photoelectric material layer 10222 | 1022 |
| Electron transport layer 10221 | |
| Second transparent sub-electrode 10213 | |
| Reflective metal sub-electrode 10212 | 1021 |
| First transparent sub-electrode 10211 | |

DISPLAY SUBSTRATE, DISPLAY PANEL, AND NEAR-EYE DISPLAY DEVICE AND DISPLAY METHOD THEREOF

CROSS-REFERENCE OF RELATED APPLICATIONS

The present application is a national phase entry under 35 U.S.C. § 371 of International Application No. PCT/CN2022/081251, filed on Mar. 16, 2022, the entire content of which is hereby incorporated by reference.

FIELD

The present disclosure relates to the technical field of display, in particular to a display substrate, a display panel, and a near-eye display device and a display method thereof.

BACKGROUND

Near-eye display, a hot research topic at present, includes virtual reality (VR) display and augmented reality (AR) display. Being capable of providing people with unprecedented interaction, near-eye display has an incalculable application value in telemedicine, industrial design, education, virtual military training, entertainment and other fields.

SUMMARY

The present disclosure provides a display substrate, a display panel, and a near-eye display device and a display method thereof. Specific solutions are as follows.

In an aspect, embodiments of the present disclosure provide a display substrate. The display substrate includes:
 a base substrate including a display area and a peripheral area located on at least one side of the display area; and
 an infrared sensor located on the base substrate.

The infrared sensor is integrated in the peripheral area. The infrared sensor includes a first electrode, a photoelectric conversion function layer and a second electrode that are arranged in a stacked manner. The first electrode is arranged adjacent to the base substrate. The second electrode is made of a transparent conductive material. The infrared sensor collects infrared rays reflected by an eye from a side where the second electrode is located.

In some embodiments, in the display substrate provided in the embodiments of the present disclosure, the first electrode is a cathode, the second electrode is an anode, and the photoelectric conversion function layer includes an electron transport layer, an organic photoelectric material layer, and a hole transport layer arranged in sequence on a side of the first electrode facing the second electrode.

In some embodiments, in the display substrate provided in the embodiments of the present disclosure, the first electrode is an anode, the second electrode is a cathode, and the photoelectric conversion function layer includes a hole transport layer, an organic photoelectric material layer, and an electron transport layer arranged in sequence on a side of the first electrode facing the second electrode.

In some embodiments, in the display substrate provided in the embodiments of the present disclosure, the second electrode is made of transparent metal.

In some embodiments, in the display substrate provided in the embodiments of the present disclosure, the second electrode is made of silver, and the second electrode has a thickness greater than or equal to 8 Å and less than or equal to 200 Å.

In some embodiments, the display substrate provided in the embodiments of the present disclosure further includes: a resistance-reducing electrode located at a side of the second electrode away from the base substrate. The resistance-reducing electrode is located at the peripheral area, and the resistance-reducing electrode directly covers the second electrode.

In some embodiments, the display substrate provided in the embodiments of the present disclosure further includes: a third electrode located in the display area. The third electrode is used for driving deflection of liquid crystal. The first electrode comprises a first transparent sub-electrode, and the first transparent sub-electrode is arranged on the same layer as the third electrode.

In some embodiments, in the display substrate provided in the embodiments of the present disclosure, the first electrode further includes a reflective metal sub-electrode stacked on the first transparent sub-electrode.

In some embodiments, in the display substrate provided in the embodiments of the present disclosure, the first electrode further includes a second transparent sub-electrode stacked on the reflective metal sub-electrode.

In some embodiments, in the display substrate provided in the embodiments of the present disclosure, the second transparent sub-electrode is made of crystalline transparent conductive oxide.

In some embodiments, the display substrate provided in the embodiments of the present disclosure further includes: a protective electrode located between the first electrode and the photoelectric conversion function layer, and an insulating layer located between a layer where the protective electrode is located and a layer where the first electrode is located. The protective electrode is electrically connected to the first electrode through a via hole penetrating the insulating layer.

In some embodiments, the display substrate provided in the embodiments of the present disclosure further includes a fourth electrode located in the display area. The fourth electrode is located on a side, away from the insulating layer, of the layer where the third electrode is located. The fourth electrode is used for driving deflection of the liquid crystal, and the protective electrode is arranged on the same layer as the fourth electrode.

In some embodiments, the display substrate provided in the embodiments of the present disclosure further includes a drive circuit layer located between a layer where the first electrode is located and the base substrate. The drive circuit layer includes a plurality of first transistors located in the display area and a plurality of second transistors located in the peripheral area. The first transistors are electrically connected to the third electrode, and the second transistors are electrically connected to the first electrode.

In another aspect, embodiments of the present disclosure provide a display panel. The display panel includes a display substrate and an opposite substrate that are arranged opposite each other, and a liquid crystal layer located between the display substrate and the opposite substrate. The display substrate is the display substrate provided in the embodiments of the present disclosure, and the liquid crystal layer is located in the display area.

In another aspect, embodiments of the present disclosure provides a near-eye display device. The near-eye display device includes a display panel and an infrared light source. The display panel is the display panel provided in the embodiments of the present disclosure. An orthographic projection of the infrared light source on a base substrate is located in the peripheral area. The orthographic projection of the infrared light source on the base substrate and an orthographic projection of the infrared sensor on the base substrate do not overlap each other.

In some embodiments, in the near-eye display device provided in the embodiments of the present disclosure, the peripheral area surrounds the display area. The infrared sensor and the infrared light source are both arranged around the display area, and the orthographic projection of the infrared sensor on the base substrate is located between the orthographic projection of the infrared light source on the base substrate and the display area.

In some embodiments, the near-eye display device provided in the embodiments of the present disclosure further includes a slit grating located between a layer where the infrared light source is located and a layer where the display panel is located. An orthographic projection of a slit contained in the slit grating on the base substrate substantially coincides with the orthographic projection of the infrared sensor on the base substrate.

In some embodiments, the near-eye display device provided in the embodiments of the present disclosure further includes a convex lens located between the layer where the infrared light source is located and a layer where the slit grating is located. An orthographic projection of the convex lens on the base substrate covers the display area and the orthographic projection of the infrared sensor on the base substrate, and the orthographic projection of the convex lens on the base substrate and the orthographic projection of the infrared light source on the base substrate do not overlap each other.

In another aspect, embodiments of the present disclosure further provide a display method of the near-eye display device. The display method includes:

controlling an infrared light source to emit light;

receiving infrared rays reflected by an eye of a user by means of an infrared sensor;

collecting an electrical signal of the infrared sensor, and determining a fixation position of the user on the display panel based on the electrical signal of the infrared sensor; and rendering an image to be displayed corresponding to the fixation position, and providing a rendered image to be displayed to the display panel for display.

DETAILED DESCRIPTION OF THE EMBODIMENTS

Figure 1:
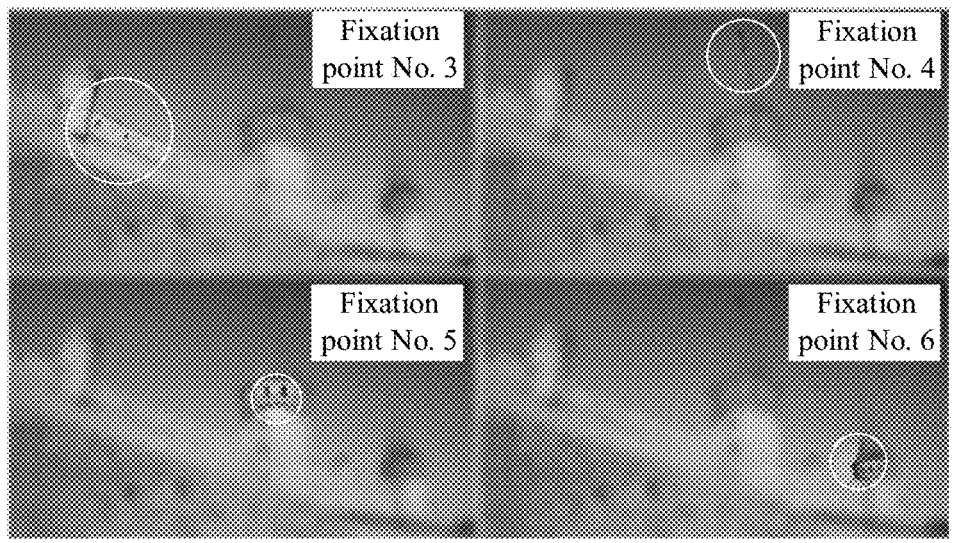
FIG. 1 is a picture comparing visual sharpness of a fixation point with that of a non-fixation point.

In order to make the objectives, technical solutions, and advantages in the embodiments of the present disclosure clearer, the technical solutions in the embodiments of the present disclosure will be clearly and completely described below with reference to the accompanying drawings in the embodiments of the present disclosure. It should be noted that sizes and shapes of all figures in the accompanying drawings do not reflect true scales, and are merely intended to illustrate contents of the present disclosure. Moreover, the same or similar reference numerals denote the same or similar elements or elements having the same or similar function throughout.

Unless otherwise defined, technical or scientific terms used herein should have ordinary meanings as understood by those of ordinary skill in the art to which the present disclosure belongs. "First", "second" and similar words used in the description and claims of the present disclosure do not mean any order, quantity or importance, but are only used for distinguishing different components. "Comprise", "include" and similar words are intended to mean that an element or item in front of the word encompasses elements or items that are listed behind the word and equivalents thereof, but do not exclude other elements or items. "Inner", "outer", "upper", "lower", etc. are merely used to indicate a relative positional relation, and when an absolute position of the described object is changed, the relative positional relation can also be changed accordingly.

The near-eye display device refers to a display device worn on eyes of a user, and includes a virtual reality display device in the form of a helmet, an augmented reality display device in the form of intelligent glasses, etc. The virtual reality display device represents a fully enclosed virtual scene, and the augmented reality display device represents an overlay scene of a virtual scene and a real scene. High-definition picture quality is the basis of near-eye display experience, which can be significantly improved by rendering the full picture. However, this rendering method has high hardware requirements and high power consumption for the near-eye display device.

It is considered that a human visual area is divided into two parts, a small central area (called foveal vision) with very high resolution and a large main visual area (called "peripheral vision") with poor resolution. People can really see things through the foveal visual area, and things seen through the peripheral visual area are blurred. The foveal visual area covers only about 2° of visual area, which corresponds approximately to a size of one fingernail on the finger after stretching an arm, or an area occupied by two to four Chinese characters on a computer screen in most visual conditions, resulting in the fact that most objects in the visual area is barely visible.

Figure 2:
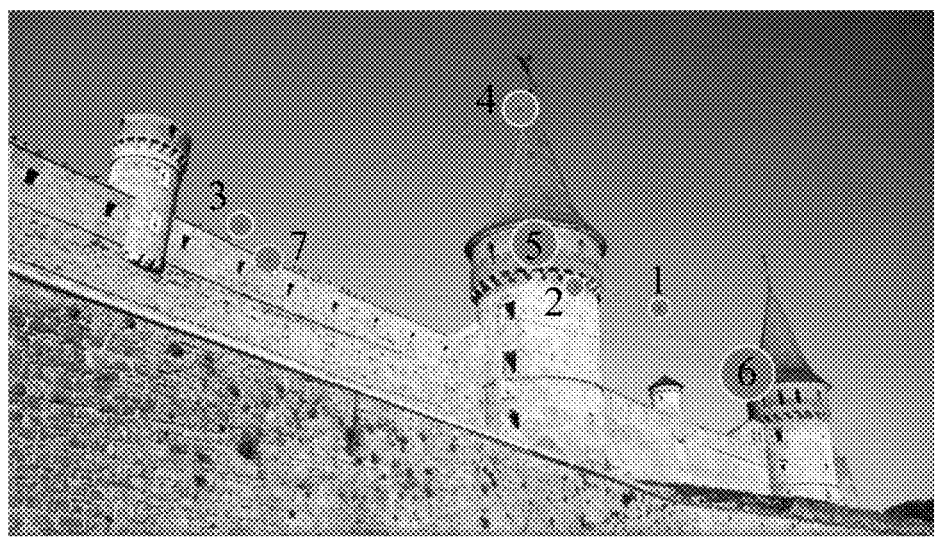
FIG. 2 is a clear picture of all fixation points spliced together.

Although a human visual system can hardly see a large part of the environment, people think that they clearly see things in the whole environment. This is because at the moment when one wants to focus on a specific part of the surrounding environment, a fixation point points directly at this specific part and focuses it clearly, as shown in FIG. 1. A human brain integrates small and clear images to form a picture of the surrounding environment in the brain (as shown in FIG. 2), and the picture is clearer than the image seen at any fixation time throughout a fixation period.

In view of this, an eye tracking technology is developed. In particular, a fixation point of an eye of the user can be determined by the eye tracking technology, such that only a picture at the fixation point can be rendered during a picture rendering process (local rendering). In this way, not only it is guaranteed that the picture seen is clear enough, but also a load of an image graphic processing unit (GPU) in the rendering process is greatly reduced, so as to reduce the hardware requirements for the near-eye display device. Moreover, fixation point rendering is also consistent with a focusing feature (a focus position is clear and a periphery is blurred) of human eyes, so as to avoid the situation that the eyes adapt to the picture and become fatigued.

The relevant near-eye display device implements eye tracking for the user by additionally mounting a camera. During implementations, light rays of a displayed picture are reflected on an eyeball of the user, and a fixation point of the user on a display screen is inferred by collecting the reflected light ray images by the camera and combining with back-end analysis. This way of positioning by recognizing a camera image is less efficient, such that a rendered image area cannot be refreshed with a higher frequency, and a better display effect cannot be achieved.

Figure 3:
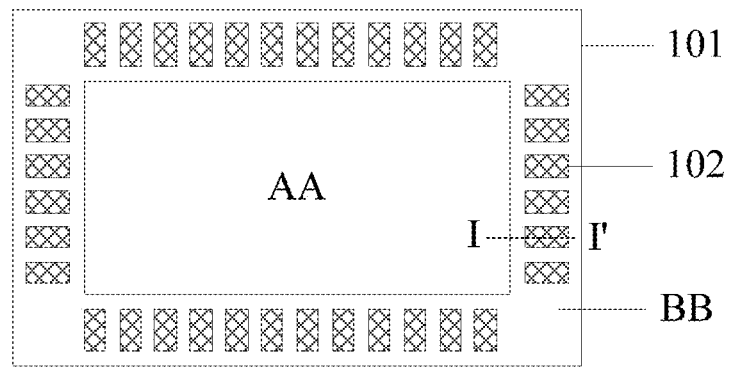
FIG. 3 is a top view of a display substrate according to an embodiment of the present disclosure.
Figure 4:
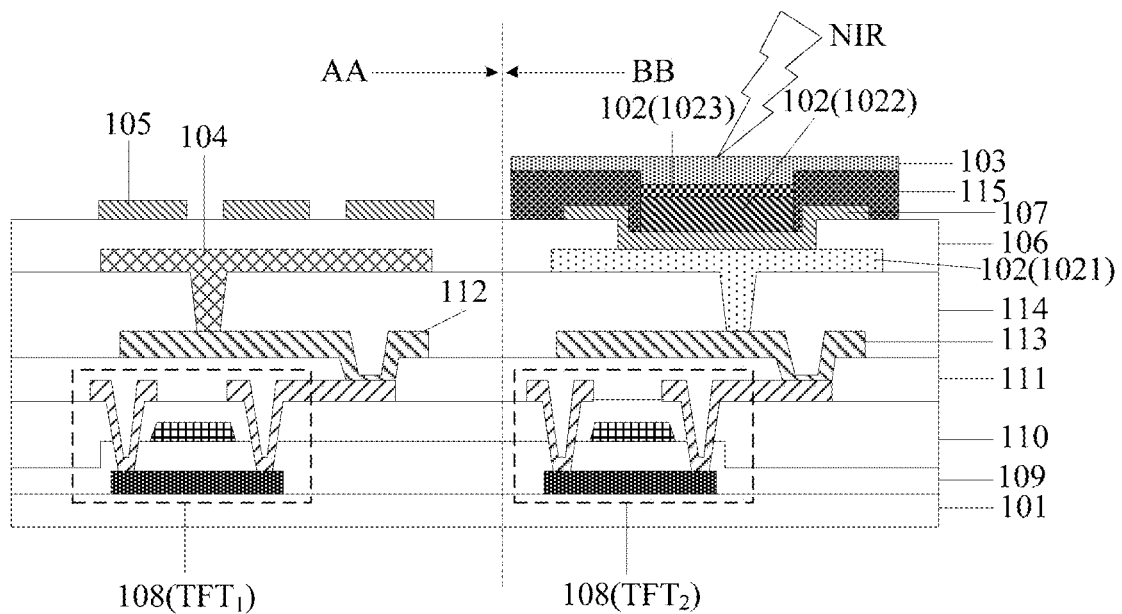
FIG. 4 is a sectional view along line I-I in FIG. 3.
Figures 5, 6:
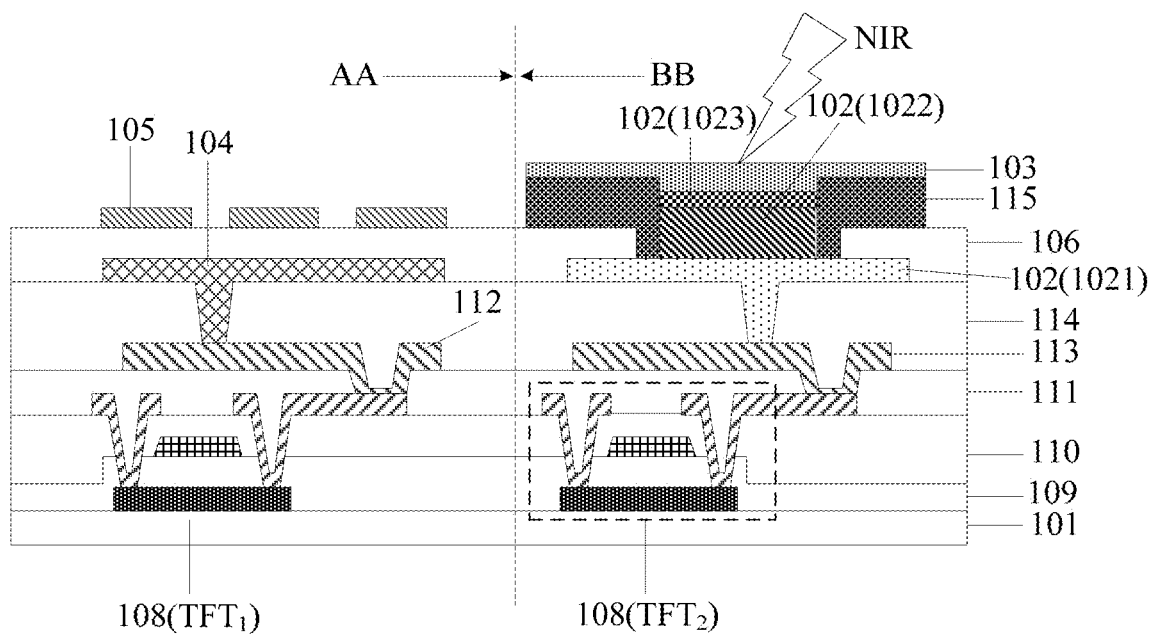
FIG. 5 is another sectional view along line I-I in FIG. 3.
FIG. 6 is a schematic structural diagram of an infrared sensor of an inverted structure according to an embodiment of the present disclosure.

In order to solve the above technical problems existing in the related art, embodiments of the present disclosure provide a display substrate, as shown in FIGS. 3-5. The display substrate includes a base substrate 101 and an infrared sensor 102.

The base substrate 101 includes a display area AA and a peripheral area BB located on at least one side of the display area AA. The base substrate 101 may be made of glass, etc.

The infrared sensor 102 is located on the base substrate 101. The infrared sensor 102 is integrated in the peripheral area BB. The infrared sensor 102 includes a first electrode 1021, a photoelectric conversion function layer 1022 and a second electrode 1023 that are arranged in a stacked manner. The first electrode 1021 is arranged adjacent to the base substrate 101. The second electrode 1023 is made of a transparent conductive material. The infrared sensor 102 may collect near infrared rays (NIR) reflected by an eye from a side where the second electrode 1023 is located.

Since a retina in the eye absorbs visible light and reflects infrared light, the retina reflects longer wavelengths of infrared light better than the rest of the eye. In view of this, in the present disclosure, after the near infrared rays reflected by the eye are collected by the infrared sensor 102, the fixation position of the user may be determined based on an electrical signal output by the infrared sensor 102 without image recognition, such that the fixation point may be tracked more quickly, and the rendered image area may be refreshed at a higher frequency, to achieve a better display effect. Furthermore, the present disclosure may integrate the infrared sensor 102 into the display substrate by means of a patterning process, which is more advantageous for achieving light-weight of the whole near-eye display device and improving the wearing experience of the user, compared with the related art of additionally mounting a camera.

Figure 7:
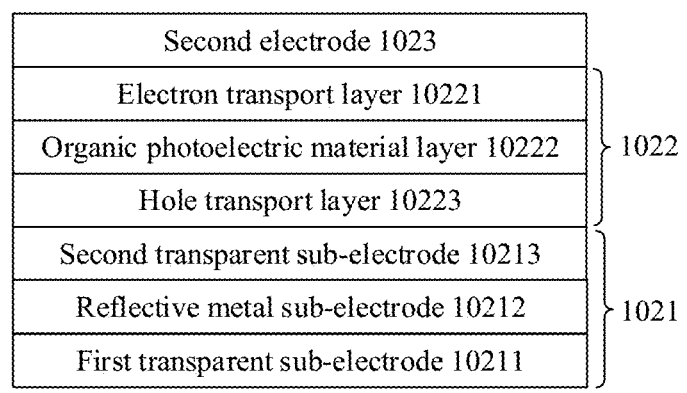
FIG. 7 is a schematic structural diagram of an infrared sensor of an upright structure according to an embodiment of the present disclosure.

In some embodiments, in the display substrate provided in the embodiments of the present disclosure, as shown in FIG. 6, the first electrode 1021 is a cathode, the second electrode 1023 is an anode, and the photoelectric conversion function layer 1022 includes an electron transport layer (ETL) 10221, an organic photoelectric material layer (Donor: Acceptor) 10222, and a hole transport layer (HTL) 10223 arranged in sequence on a side of the first electrode 1021 facing the second electrode 1023. In this case, the infrared sensor 102 is of an inverted structure. Alternatively, in some embodiments, as shown in FIG. 7, the first electrode 1021 may be an anode, the second electrode 1023 may be a cathode, and the photoelectric conversion function layer 1022 includes a hole transport layer 10223, an organic photoelectric material layer 10222, and an electron transport layer 10221 arranged in sequence on a side of the first electrode 1021 facing the second electrode 1023. In this case, the infrared sensor 102 is of an upright structure. The infrared sensor 102 of an inverted structure has lower noise and higher signal-to-noise ratio.

It should be noted that in the related art, the infrared sensor 102, whether having an upright structure or an inverted structure, is arranged adjacent to the base substrate 101, and a side where the first electrode 1021 made of amorphous indium tin oxide is located is a light incident surface. In contrast, in the present disclosure, a side where the second electrode 1023 is located away from the base substrate 101 is a light incident surface. In view of this, in the display substrate provided in the embodiments of the present disclosure, the second electrode 1023 may be made of transparent metal. Optionally, under the condition that the infrared sensor 102 uses an inverted structure, the second electrode 1023 may be made of silver (Ag), gold (Au), etc. Under the condition that the infrared sensor 102 uses an upright structure, the second electrode 1023 may be made of aluminum (Al), etc. In order to improve the transmittance of the second electrode 1023, on the basis of guaranteeing the continuity of film formation, a thinner second electrode 1023 is better. Illustratively, when the second electrode 1023 is made of silver, the thickness of the second electrode 1023 may be greater than or equal to 8 Å and less than or equal to 200 Å, for example, 8 Å, 10 Å, 20 Å, 30 Å, 40 Å, 50 Å, 60 Å, 70 Å, 80 Å, 90 Å, 100 Å, 110 Å, 120 Å, 130 Å, 140

Å, 150 Å, 160 Å, 170 Å, 180 Å, 190 Å, 200 Å, etc. in order to balance the continuity of film formation and transmittance.

In some embodiments, in the display substrate provided in the embodiments of the present disclosure, as shown in FIGS. 4 and 5, the display substrate may further include: a resistance-reducing electrode 103 located at a side of the second electrode 1023 away from the base substrate 101. The resistance-reducing electrode 103 is located at the peripheral area BB, and the resistance-reducing electrode 103 directly covers the second electrode 1023, such that the entire resistance of the resistance-reducing electrode 103 and the second electrode 1023 is smaller, which is conducive to improvement in size uniformity of signals during transmission. Optionally, in order to simplify the patterning process, the resistance-reducing electrode 103 may be arranged on an entire surface in the peripheral area BB. In some embodiments, the resistance-reducing electrode 103 may be made of a transparent conductive oxide such as aluminum-doped zinc oxide (AZO).

In some embodiments, the display substrate provided in the embodiments of the present disclosure, as shown in FIGS. 4-8, may further include: a third electrode 104 located in the display area AA. The third electrode 104 is used for driving deflection of liquid crystal. Optionally, the third electrode 104 is a common electrode or a pixel electrode. The first electrode 1021 may include a first transparent sub-electrode 10211 arranged on the same layer as the third electrode 104. It is to be noted that in the present disclosure, the "same layer" refers to a layer structure in which a film layer for making a specific pattern is formed by using the same film-forming process and then formed through a single patterning process by using the same mask. That is, a single patterning process corresponds to one mask (also called photomask). According to the particular pattern, a single patterning process may include repeated exposure, development, or etching processes, the particular pattern in the formed layer structure may be continuous or not, and the particular patterns may be located at the same height or have the same thickness, or may be located at different heights or have different thicknesses. Therefore, by arranging the first transparent sub-electrode 10211 on the same layer as the third electrode 104, the number of patterning times may be reduced, and the production efficiency may be improved.

Figure 8:
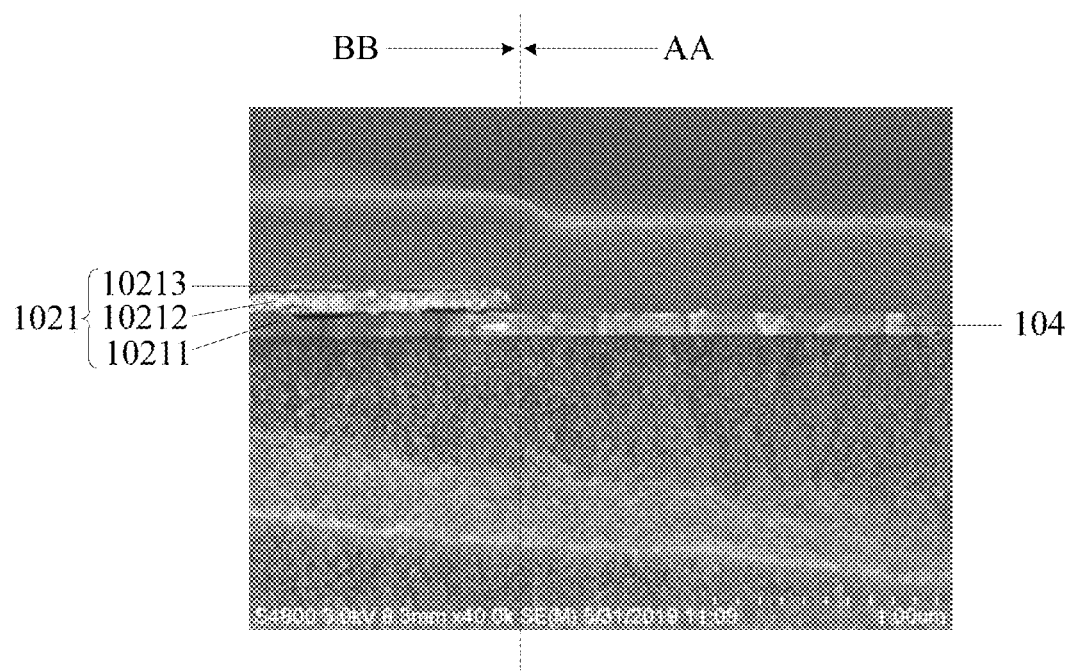
FIG. 8 is an electron micrograph of a first electrode and a third electrode according to an embodiment of the present disclosure.

In some embodiments, in the display substrate provided by the embodiments of the present disclosure, as shown in FIGS. 6-8, the first electrode 1021 may further include a reflective metal sub-electrode 10212 stacked on the first transparent sub-electrode 10211, such that infrared rays that are not absorbed by the organic photoelectric material layer 10222 are re-incident on the organic photoelectric material layer 10222 after being reflected by the reflective metal sub-electrode 10212, so as to improve an absorption conversion rate (that is, a light utilization rate) of infrared rays by the organic photoelectric material layer 10222 and improve the semaphore. Optionally, the reflective metal sub-electrode 10212 may be made of silver (Ag), etc.

In some embodiments, in the display substrate provided in the embodiments of the present disclosure, as shown in FIGS. 6-8, the first electrode 1021 may further include a second transparent sub-electrode 10213 stacked on the reflective metal sub-electrode 10212. In this way, work function match between the first electrode 1021 and an upper contact film layer (for example, an electron transport layer or a hole transport layer) may be effectively satisfied. Optionally, the first transparent sub-electrode 10211 and the second transparent sub-electrode 10213 may be made of amorphous indium tin oxide (ITO), etc.

In some embodiments, the display substrate provided by embodiments of the present disclosure, as shown in FIGS. 4 and 5, may further include a fourth electrode 105 located on a side of the third electrode 104 away from the base substrate 101. A first insulating layer 106 is arranged between a layer where the third electrode 104 is located and a layer where the fourth electrode 105 is located. Optionally, the third electrode 104 may serve as a pixel electrode, and the fourth electrode 105 may serve as a common electrode. Alternatively, the third electrode 104 may serve as a common electrode, and the fourth electrode 105 may serve as a pixel electrode. The present disclosure is described exemplarily with the third electrode 104 serving as a pixel electrode and the fourth electrode 105 serving as a common electrode. Since the fourth electrode 105 may be made of amorphous indium tin oxide, etc., in order to avoid the etching damage caused by an etching process of the fourth electrode 105 to the second transparent sub-electrode 10213 of the same material below the fourth electrode 105, after completing a patterning process of the second transparent sub-electrode 10213, the material of the second transparent sub-electrode 10213 may be converted from an amorphous state to a crystalline state by high-temperature baking.

Further, in some embodiments, as shown in FIG. 4, a protective electrode 107 may be further arranged between the first electrode 1021 and the photoelectric conversion function layer 1022. The protective electrode 107 is electrically connected to the first electrode 1021 through a via hole penetrating the first insulating layer 106, such that the first electrode 1021 may be protected by the protective electrode 107. Optionally, the protective electrode 107 may be arranged on the same layer as the fourth electrode 105, such that the protective electrode 107 may be manufactured when the fourth electrode 105 is manufactured, to avoid an additional patterning process of the protective electrode 107, reduce the number of patterning frequency and improve production efficiency.

In some embodiments, the display substrate provided in the embodiments of the present disclosure, as shown in FIGS. 4 and 5, may further include a drive circuit layer 108 located between a layer where the first electrode 1021 is located and the base substrate 101. The drive circuit layer 108 may include a plurality of first transistors $TFT_1$ located in the display area AA and a plurality of second transistors $TFT_2$ located in the peripheral area BB. The first transistors $TFT_1$ are electrically connected to the third electrode 104, and the second transistors $TFT_2$ are electrically connected to the first electrode 1021. Optionally, the first transistors $TFT_1$ and the second transistor $TFT_2$ may be top gate type transistors (as shown in FIGS. 4 and 5), bottom gate type transistors or double gate type transistors. Active layer materials of the first transistors $TFT_1$ and the second transistors $TFT_2$ may be amorphous silicon, low temperature polysilicon, an oxide (for example, indium gallium zinc oxide), etc.

In some embodiments, the display substrate provided in the embodiments of the present disclosure, as shown in FIGS. 4 and 5, may further include a gate insulating layer 109, an interlayer dielectric layer 110, a second insulating layer 111, a first switching electrode 112 and a second switching electrode 113 arranged on the same layer, a planarization layer 114, a pixel definition layer 115, etc. Other essential components of the display substrate will be understood by those of ordinary skill in the art and are not repeated herein and not intended to limit the present disclosure.

Figure 9:
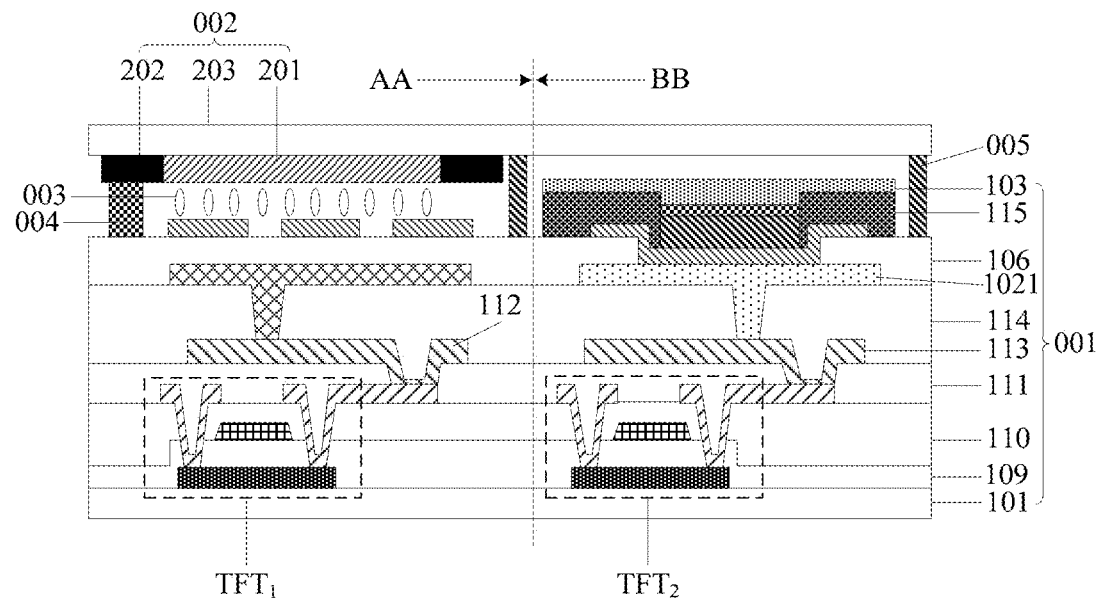
FIG. 9 is a schematic structural diagram of a display panel according to an embodiment of the present disclosure.
Figure 10:
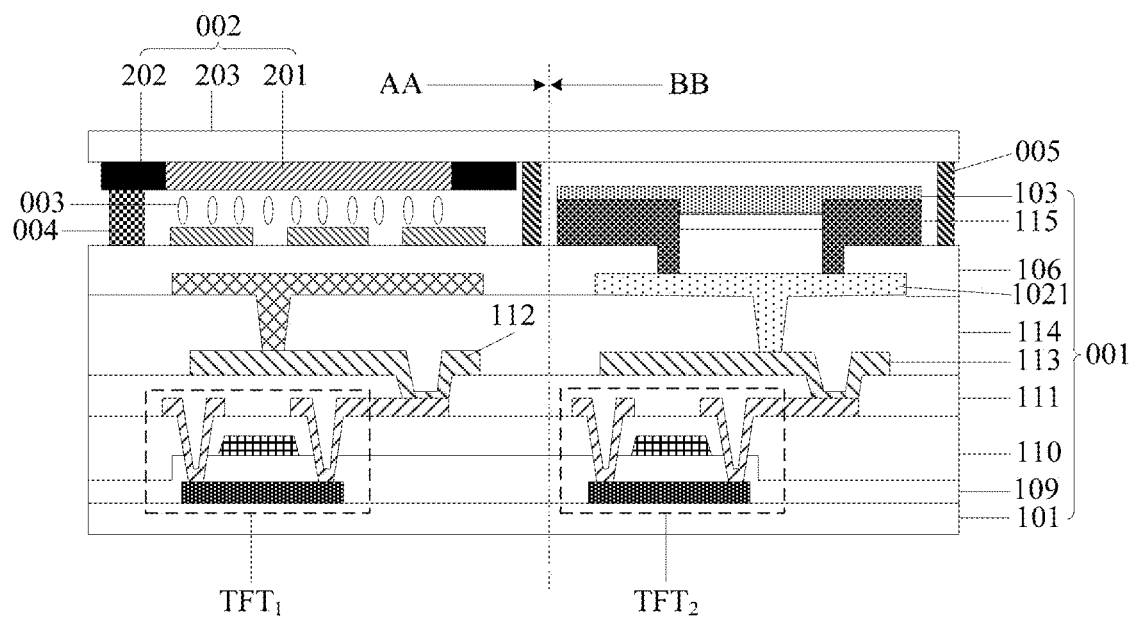
FIG. 10 is another schematic structural diagram of a display panel according to an embodiment of the present disclosure.

Based on the same inventive concept, embodiments of the present disclosure provide a display panel. As shown in FIGS. 9 and 10, the display panel includes a display substrate 001 and an opposite substrate 002 that are arranged opposite each other, and a liquid crystal layer 003 located between the display substrate 001 and the opposite substrate 002. The display substrate 001 is the display substrate 001 provided in the embodiments of the present disclosure, and the liquid crystal layer 003 is located in the display area AA. Optionally, the opposite substrate 002 includes a color resistor 201, a black matrix 202, and a glass substrate 203, etc. The display panel may further include a spacer 004, a frame sealing adhesive 005, etc. Since the principle for solving problems of the display panel is similar to that of the foregoing display substrate, reference may be made to the implementation of the foregoing display substrate for the implementation of the display panel, which is not repeated herein.

Furthermore, embodiments of the present disclosure further provide a manufacturing process for a display panel as shown in FIG. 9. The manufacturing process may include the following steps.

Figure 11:
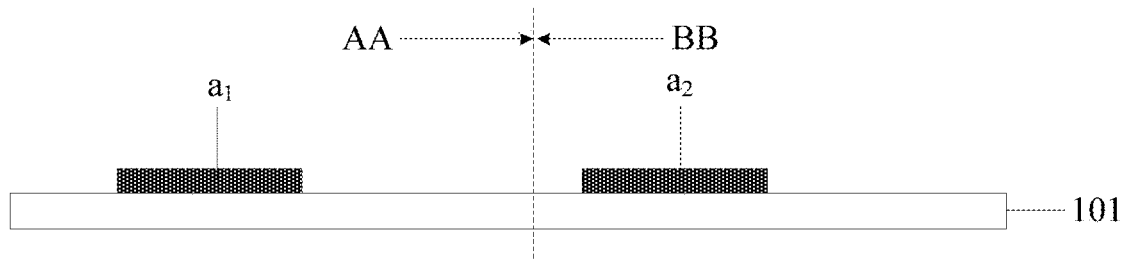
FIG. 11 is a schematic structural diagram of a display panel as shown in FIG. 9 during manufacture.

Step 1, a first active layer $a_1$ of a first transistor $TFT_1$ is formed in a display area AA, and a second active layer $a_2$ of a second transistor $TFT_2$ is further formed in a peripheral area BB, as shown in FIG. 11.

Figure 12:
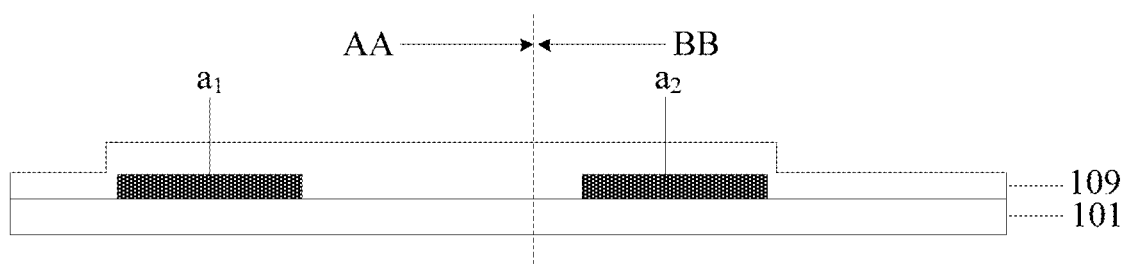
FIG. 12 is another schematic structural diagram of a display panel as shown in FIG. 9 during manufacture.

Step 2, a gate insulating layer 109 is integrally formed on the first active layer $a_1$ and the second active layer $a_2$, as shown in FIG. 12.

Figure 13:
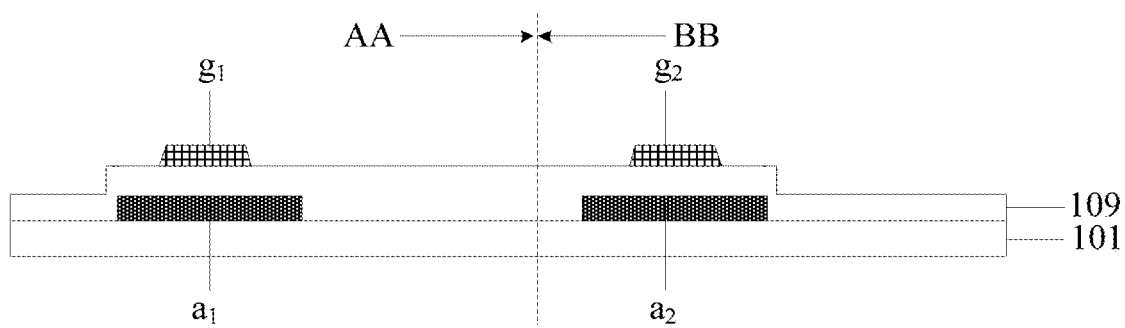
FIG. 13 is yet another schematic structural diagram of a display panel as shown in FIG. 9 during manufacture.

Step 3, a first gate $g_1$ of the first transistor $TFT_1$ is formed on the gate insulating layer 109 in the display area AA, and a second gate $g_2$ of the second transistor $TFT_2$ is further formed on the gate insulating layer 109 in the peripheral area BB, as shown in FIG. 13. The first gate $g_1$ and the second gate $g_2$ may be made of metal, for example, molybdenum (Mo), titanium (Ti), aluminum (Al), etc.

Figure 14:
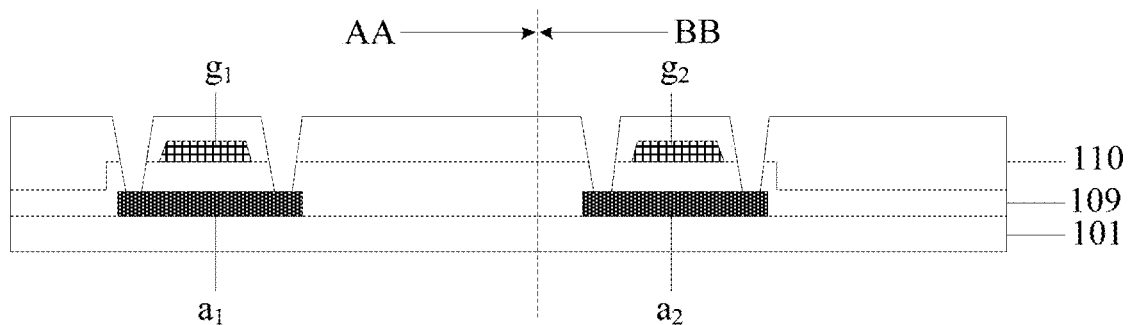
FIG. 14 is yet another schematic structural diagram of a display panel as shown in FIG. 9 during manufacture.

Step 4, an interlayer dielectric layer 110 having a via hole is formed on a layer where the first gate $g_1$ and the second gate $g_2$ are located, and the via hole penetrates the interlayer dielectric layer 110 and the gate insulating layer 109, as shown in FIG. 14.

Figure 15:
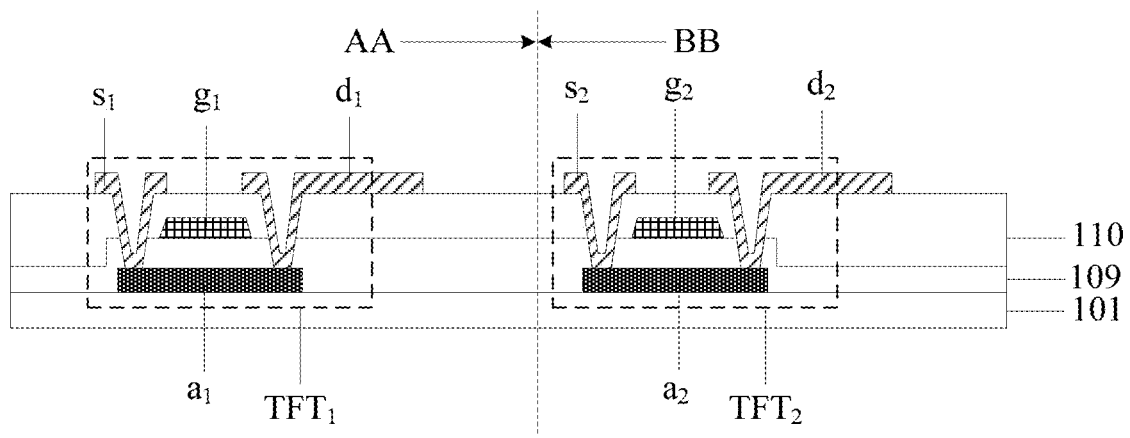
FIG. 15 is yet another schematic structural diagram of a display panel as shown in FIG. 9 during manufacture.

Step 5, a first source $s_1$ and a first drain $d_1$ of the first transistor $TFT_1$ are formed on the interlayer dielectric layer 110 in the display area AA, and a second source $s_2$ and a second drain $d_2$ of the second transistor $TFT_2$ are further formed on the interlayer dielectric layer 110 in the peripheral area BB, such that the first source $s_1$ and the first drain $d_1$ are electrically connected to the first active layer $a_1$ through the via hole penetrating the interlayer dielectric layer 110 and the gate insulating layer 109, and the second source $s_2$ and the second drain $d_2$ are electrically connected to the second active layer $a_2$ through the via hole penetrating the interlayer dielectric layer 110 and the gate insulating layer 109, as shown in FIG. 15. The first source $s_1$, the first drain $d_1$, the second source $s_2$ and the second drain $d_2$ may be made of metal, for example, molybdenum (Mo), titanium (Ti), aluminum (Al), etc., and the first source $s_1$, the first drain $d_1$, the second source $s_2$ and the second drain $d_2$ may be of a single layer structure or a stacked layer structure, which is not limited herein. In some embodiments, the first source $s_1$ and the first drain $d_1$ may be interchanged, and the second source $s_2$ and the second drain $d_2$ may be interchanged, and which are not specifically limited herein.

Figure 16:
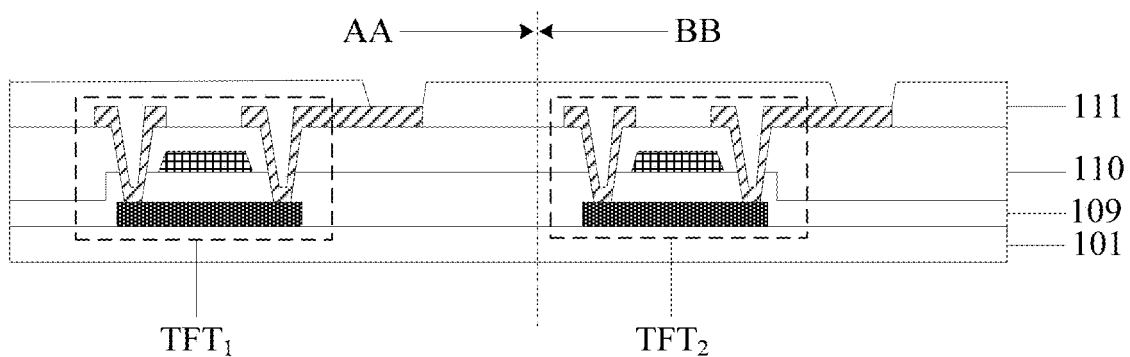
FIG. 16 is yet another schematic structural diagram of a display panel as shown in FIG. 9 during manufacture.

Step 6, a second insulating layer 111 having a via hole is formed on a layer where the first source $s_1$, the first drain $d_1$, the second source $s_2$ and the second drain $d_2$ are located, as shown in FIG. 16. The second insulating layer 111 may be made of silicon oxide, silicon nitride, silicon oxynitride, etc., and the second insulating layer 111 may be of a single layer structure or a stacked layer structure, which are not limited herein.

Figure 17:
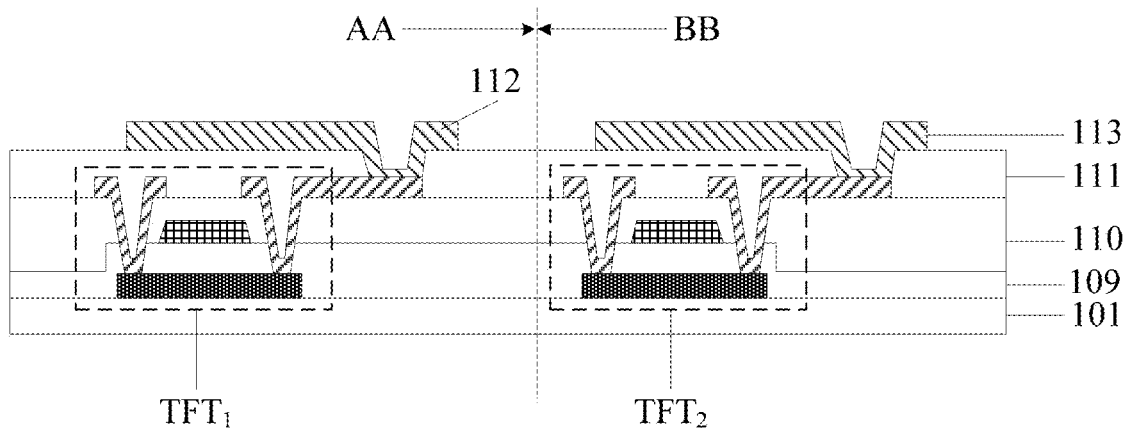
FIG. 17 is yet another schematic structural diagram of a display panel as shown in FIG. 9 during manufacture.

Step 7, a first switching electrode 112 and a second switching electrode 113 are formed on the second insulating layer 111. The first switching electrode 112 is electrically connected to the first drain $d_1$ through the via hole penetrating the second insulating layer 111, and the second switching electrode 113 is electrically connected to the second drain $d_2$ through the via hole penetrating the second insulating layer 111, as shown in FIG. 17. The first switching electrode 112 and the second switching electrode 113 may be made of metal, for example, molybdenum (Mo), titanium (Ti), aluminum (Al), etc., and the first switching electrode 112 and the second switching electrode 113 may be of a single layer structure or a stacked layer structure, which are not limited herein.

Figure 18:
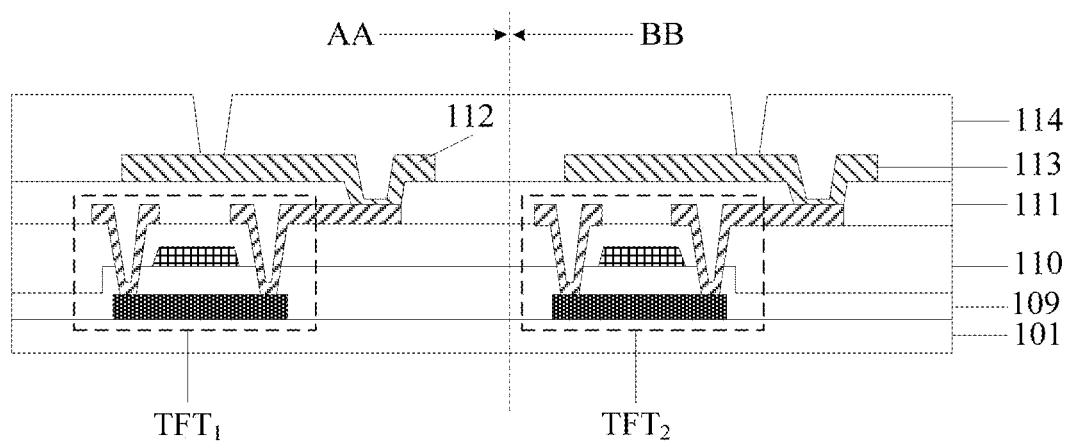
FIG. 18 is yet another schematic structural diagram of a display panel as shown in FIG. 9 during manufacture.

Step 8, a planarization layer 114 having a via hole is formed on a layer where the first switching electrode 112 and the second switching electrode 113 are located, as shown in FIG. 18.

Figure 19:
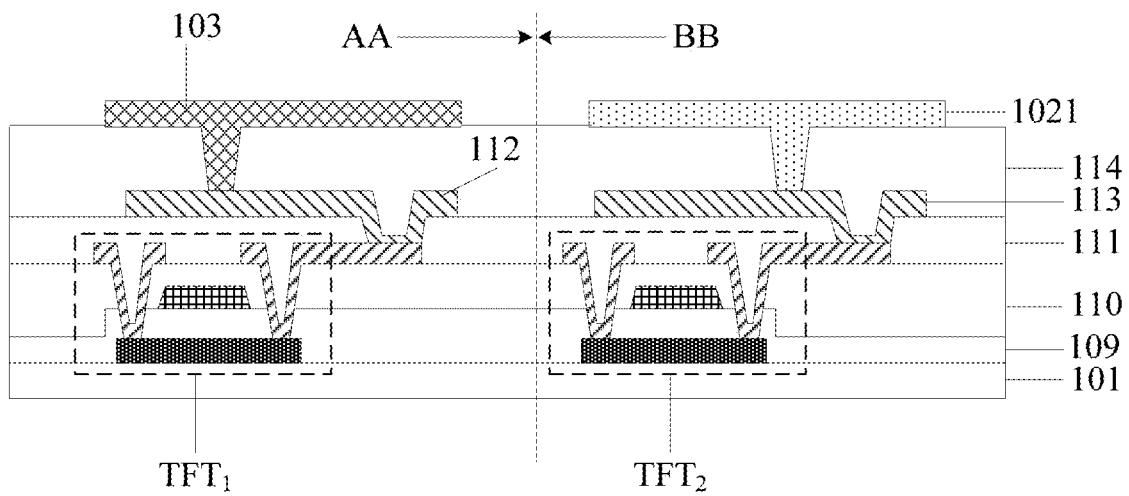
FIG. 19 is yet another schematic structural diagram of a display panel as shown in FIG. 9 during manufacture.

Step 9, a first indium tin oxide layer, a silver metal layer and a second indium tin oxide layer are successively deposited on the planarization layer 114, and then a first patterning process is used to pattern the first indium tin oxide layer, the silver metal layer and the second indium tin oxide layer of the peripheral area BB, to obtain a first electrode 1021 having a first transparent sub-electrode 10211, a reflective metal sub-electrode 10212 and a second transparent sub-electrode 10213 that are arranged in a stacked manner. A second patterning process is used to etch the first indium tin oxide layer, the silver metal layer and the second indium tin oxide layer in the display area AA to a structure where only the first indium tin oxide layer remains, to form a third electrode 104 (for example, a pixel electrode). The first electrode 1021 is electrically connected to the second switching electrode 113 through the via hole penetrating the planarization layer 114, and the third electrode 104 is electrically connected to the first switching electrode 112 through the via hole penetrating the planarization layer 114, as shown in FIG. 19.

Figure 20:
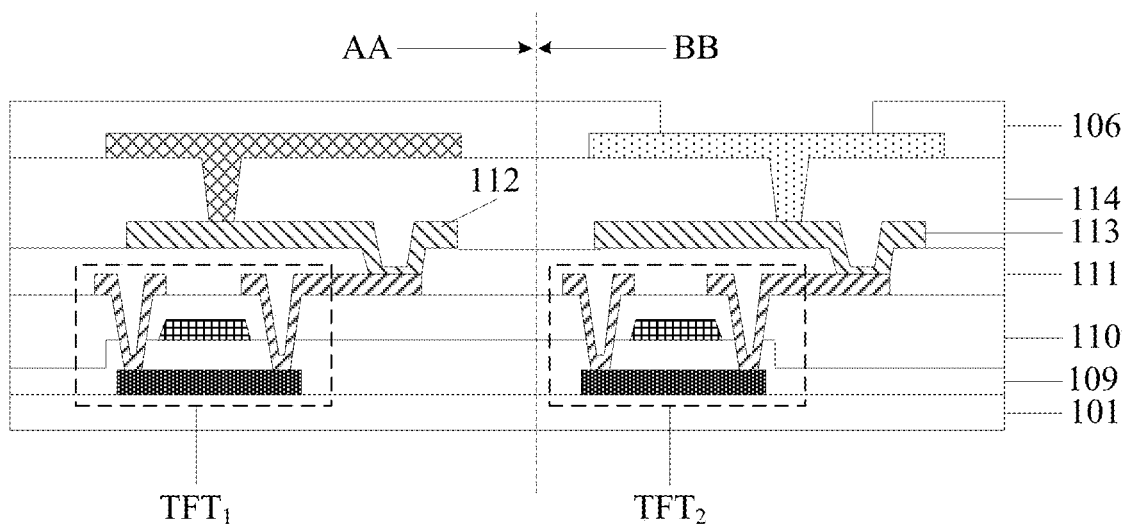
FIG. 20 is yet another schematic structural diagram of a display panel as shown in FIG. 9 during manufacture.

Step 10, a first insulating layer 106 is formed on a layer where the first electrode 1021 is located, and the first insulating layer 106 has a via hole at the position of the first electrode 1021, as shown in FIG. 20.

Figure 21:
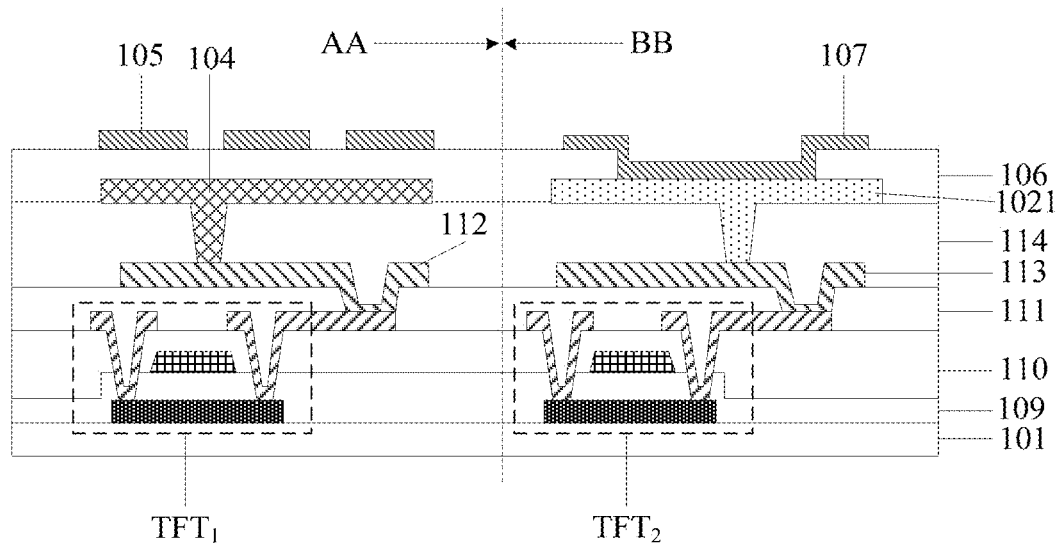
FIG. 21 is yet another schematic structural diagram of a display panel as shown in FIG. 9 during manufacture.

Step 11, a fourth electrode 105 (for example, a common electrode) is formed on the display area AA on the first insulating layer 106, a protective electrode 107 is further formed on the peripheral area BB, and the protective electrode 107 is electrically connected to the first electrode 1021 through the via hole of the first insulating layer 106, as shown in FIG. 21.

Figure 22:
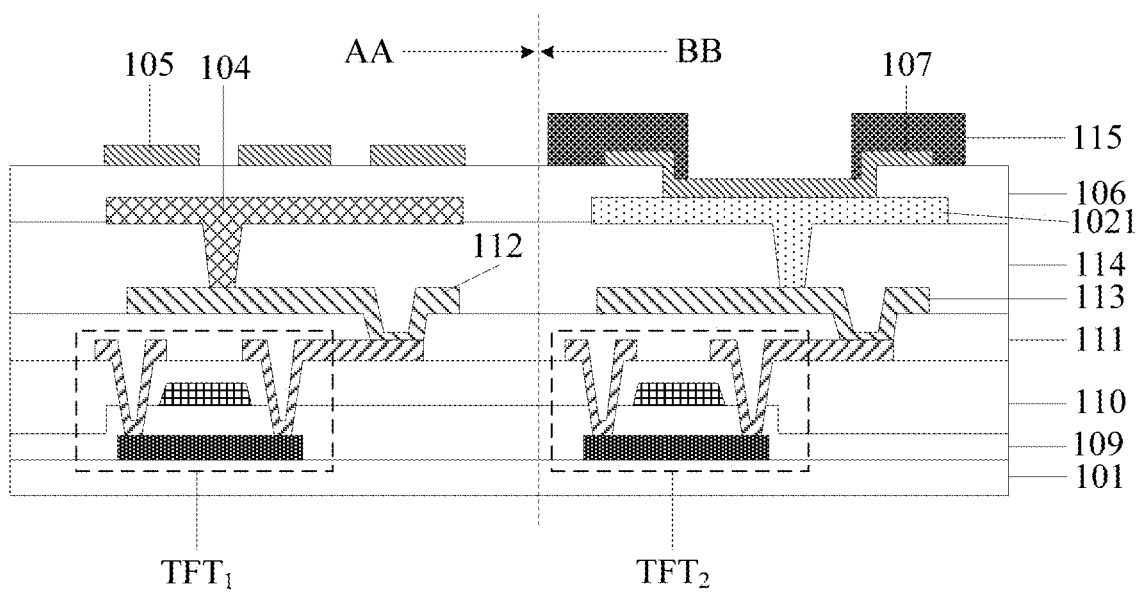
FIG. 22 is yet another schematic structural diagram of a display panel as shown in FIG. 9 during manufacture.

Step 12, a pixel definition layer 115 for defining the position of each first electrode 1021 is formed in the peripheral area BB on a layer where the fourth electrode 105 and the protective electrode 107 are located, as shown in FIG. 22.

Figure 23:
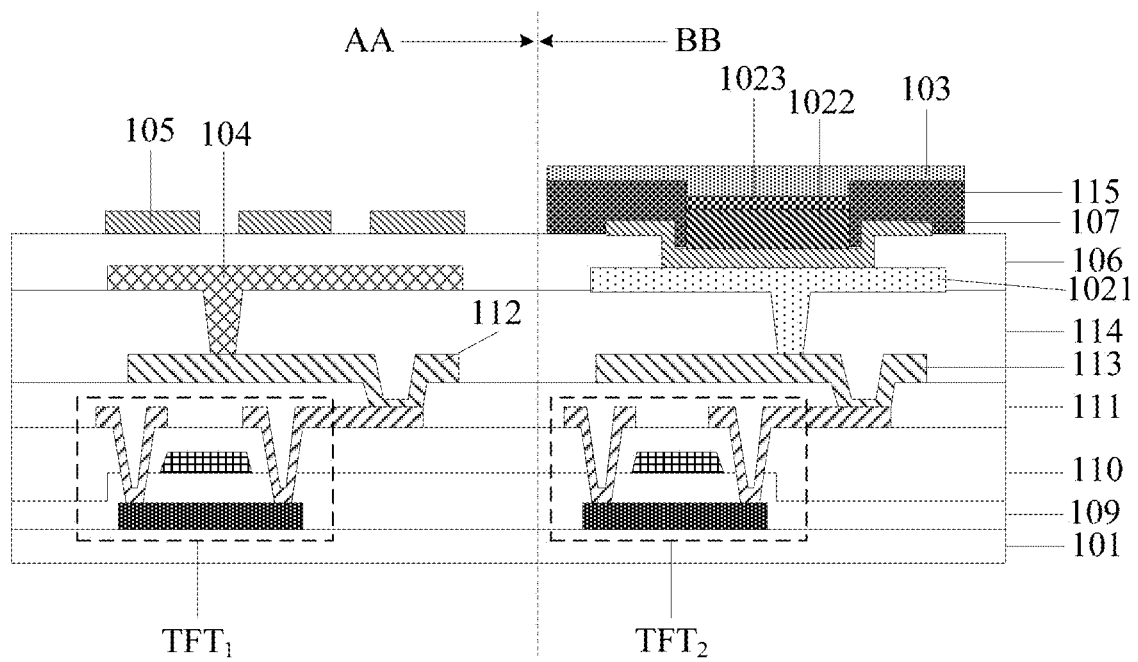
FIG. 23 is still another schematic structural diagram of a display panel as shown in FIG. 9 during manufacture.

Step 13, a photoelectric conversion function layer 1022, a second electrode 1023 and a resistance-reducing electrode 103 are sequentially formed in the peripheral area BB on a layer where the pixel definition layer 115 is located, as shown in FIG. 23.

Step 14, after aligning a display substrate 001 with an opposite substrate 002 shown in FIG. 23, a crystal filling process and a packaging process are performed successively, as shown in FIG. 9. Thus, manufacture of the display panel as shown in FIG. 9 is completed.

Based on the same inventive concept, embodiments of the present disclosure provide a near-eye display device. The near-eye display device includes the display panel provided in the embodiments of the present disclosure. Since the principle for solving a problem of the near-eye display device is similar to that of the foregoing display panel, reference may be made to the implementation of the foregoing display panel for the implementation of the near-eye display device, which is not repeated herein.

Figure 24:
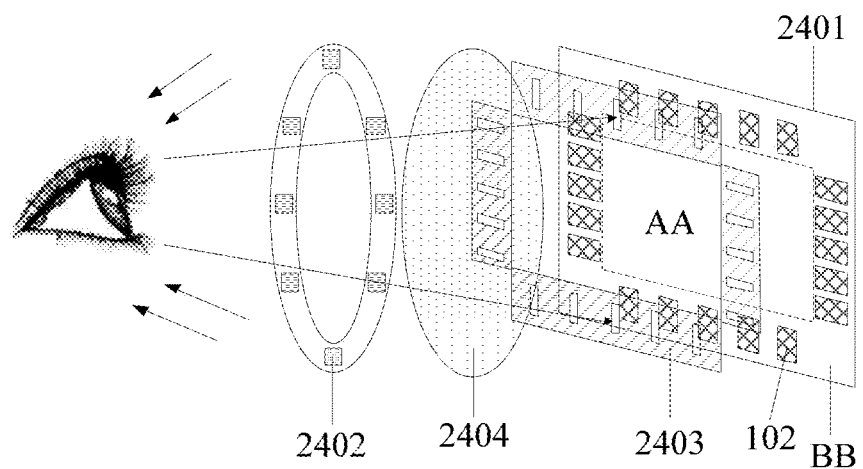
FIG. 24 is a schematic structural diagram of a near-eye display device according to an embodiment of the present disclosure.

In some embodiments, as shown in FIG. 24, the near-eye display device provided in the embodiments of the present disclosure includes a display panel 2401 and an infrared light source 2402. The display panel 2401 is the display panel 2401 provided in the embodiments of the present disclosure. An orthographic projection of the infrared light source 2402 on a base substrate 101 is located in a peripheral area BB, and the orthographic projection of the infrared light source 2402 on the base substrate 101 and an orthographic projection of the infrared sensor 102 on the base substrate 101 do not overlap each other, so as to prevent the infrared light source 2402 from influencing the infrared sensor 102 to receive the infrared rays reflected by the eye.

In some embodiments, in the near-eye display device provided in the embodiments of the present disclosure, as shown in FIG. 24, the peripheral area BB surrounds the display area AA. The infrared sensor 102 and the infrared light source 2402 are both arranged around the display area AA. The orthographic projection of the infrared sensor 102 on the base substrate 101 is located between the orthographic projection of the infrared light source 2402 on the base substrate 101 and the display area AA. In this way, the infrared sensor 102 is relatively close to the display area AA, which is conducive to the integration of the infrared sensor 102 on the display substrate 001 by using a patterning process.

In some embodiments, in the near-eye display device provided in the embodiments of the present disclosure, as shown in FIG. 24, in order to obtain parallel light with desirable coherence, a slit grating 2403 may further be arranged between a layer where the infrared light source 2402 is located and a layer where the display panel 2401 is located, and an orthographic projection of a slit contained in the slit grating 2403 on the base substrate 101 substantially coincides (that is, exactly coincides, or within an error range caused by manufacture, measurement and other factors) with the orthographic projection of the infrared sensor 102 on the base substrate 101.

In some embodiments, the near-eye display device provided in the embodiments of the present disclosure, as shown in FIG. 24, may further include a convex lens 2404 located between the layer where the infrared light source 2402 is located and a layer where the slit grating 2403 is located. An orthographic projection of the convex lens 2404 on the base substrate 101 covers the display area AA and the orthographic projection of the infrared sensor 102 on the base substrate 101. The orthographic projection of the convex lens 2404 on the base substrate 101 and the orthographic projection of the infrared light source 2402 on the base substrate 101 do not overlap each other. The convex lens 2404 converges a display picture to the eye for near-eye display.

Based on the same inventive concept, embodiments of the present disclosure provide a display method of a near-eye display device. The principle for solving a problem of the display method is similar to that of the near-eye display device, such that reference may be made to the embodiments of the near-eye display device for the implementation of the display method, which is not repeated herein.

Figure 25:
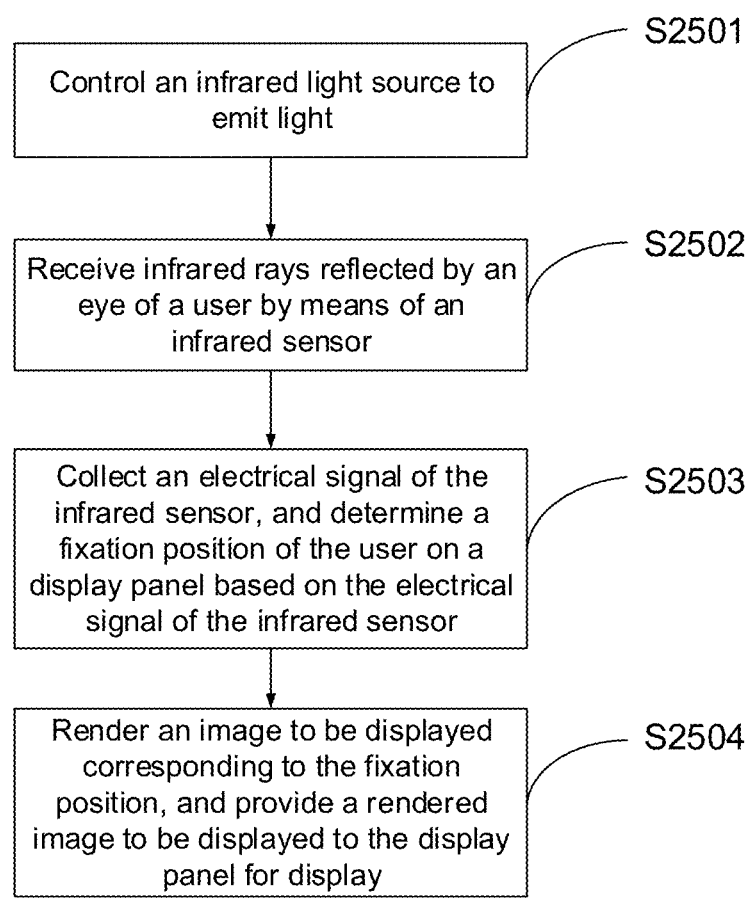
FIG. 25 is a flowchart of a display method for a near-eye display device according to an embodiment of the present disclosure.

For example, embodiments of the present disclosure provide a display method of a near-eye display device, as shown in FIG. 25. The display method includes the following steps.

S2501, an infrared light source is controlled to emit light.

S2502, infrared rays reflected by an eye of a user is received by means of an infrared sensor.

S2503, an electrical signal of the infrared sensor is collected, and a fixation position of the user on a display panel is determined based on the electrical signal of the infrared sensor.

S2504, an image to be displayed corresponding to the fixation position is rendered, and a rendered image to be displayed is provided to the display panel for display.

It will be apparent to those skilled in the art that various modifications and variations can be made to the embodiments of the present disclosure without departing from the spirit and scope of the embodiments of the present disclosure. Thus, if modifications and variations to the embodiments of the present disclosure fall within the scope of the appended claims of the present disclosure and their equivalents, it is intended that the present disclosure cover such modifications and variations as well.

What is claimed is:

1. A display substrate, comprising:
   a base substrate comprising:
     a display area, and
     a peripheral area on at least one side of the display area;
   an infrared sensor on the base substrate;
   wherein the infrared sensor is integrated in the peripheral area and comprises:
   a first electrode, a photoelectric conversion function layer and a second electrode that are arranged in a stacked manner;
   a resistance-reducing electrode on a side of the second electrode away from the base substrate; wherein the resistance-reducing electrode is at the peripheral area and directly covers the second electrode; and
   a third electrode in the display area;
   wherein the first electrode is arranged adjacent to the base substrate, the second electrode is made of a transparent conductive material, and the infrared sensor collects infrared rays reflected by an eye from a side where the second electrode is located;
   the third electrode is for driving deflection of liquid crystal; and
   the first electrode comprises:
     a first transparent sub-electrode;
     wherein the first transparent sub-electrode is arranged on a same layer as the third electrode.

2. The display substrate according to claim 1, wherein the first electrode is a cathode, the second electrode is an anode, and the photoelectric conversion function layer comprises:
   an electron transport layer, an organic photoelectric material layer, and a hole transport layer arranged in sequence on a side of the first electrode facing the second electrode.

3. The display substrate according to claim 1, wherein the first electrode is an anode, the second electrode is a cathode, and the photoelectric conversion function layer comprises:
a hole transport layer, an organic photoelectric material layer, and an electron transport layer arranged in sequence on a side of the first electrode facing the second electrode.

4. The display substrate according to claim 1, wherein the second electrode is made of transparent metal.

5. The display substrate according to claim 2, wherein the second electrode is made of silver, and the second electrode has a thickness greater than or equal to 8 Å and less than or equal to 200 Å.

6. The display substrate according to claim 1, wherein the first electrode further comprises:
a reflective metal sub-electrode stacked on the first transparent sub-electrode.

7. The display substrate according to claim 6, wherein the first electrode further comprises:
a second transparent sub-electrode stacked on the reflective metal sub-electrode.

8. The display substrate according to claim 7, wherein the second transparent sub-electrode is made of crystalline transparent conductive oxide.

9. The display substrate according to claim 7, further comprising:
a protective electrode between the first electrode and the photoelectric conversion function layer, and
an insulating layer between a layer where the protective electrode is located and a layer where the first electrode is located;
wherein the protective electrode is electrically connected to the first electrode through a via hole penetrating the insulating layer.

10. The display substrate according to claim 9, further comprising:
a fourth electrode in the display area;
wherein the fourth electrode is on a side, away from the insulating layer, of the layer where the third electrode is located, the fourth electrode is for driving deflection of the liquid crystal, and the protective electrode is arranged on a same layer as the fourth electrode.

11. The display substrate according to claim 1, further comprising:
a drive circuit layer between a layer where the first electrode is located and the base substrate;
wherein the drive circuit layer comprises:
a plurality of first transistors in the display area; and
a plurality of second transistors in the peripheral area;
wherein the first transistors are electrically connected to the third electrode, and the second transistors are electrically connected to the first electrode.

12. A display panel, comprising:
a display substrate and an opposite substrate that are arranged opposite each other, and
a liquid crystal layer between the display substrate and the opposite substrate,
wherein the display substrate is the display substrate according to claim 1, and the liquid crystal layer is in the display area.

13. A near-eye display device, comprising:
a display panel, and
an infrared light source,
wherein the display panel is the display panel according to claim 12, an orthographic projection of the infrared light source on the base substrate is in the peripheral area, and the orthographic projection of the infrared light source on the base substrate and an orthographic projection of the infrared sensor on the base substrate do not overlap each other.

14. The near-eye display device according to claim 13, wherein the peripheral area surrounds the display area; and the infrared sensor and the infrared light source are both arranged around the display area, and the orthographic projection of the infrared sensor on the base substrate is between the orthographic projection of the infrared light source on the base substrate and the display area.

15. The near-eye display device according to claim 13, further comprising:
a slit grating between a layer where the infrared light source is located and a layer where the display panel is located,
wherein an orthographic projection of a slit contained in the slit grating on the base substrate substantially coincides with the orthographic projection of the infrared sensor on the base substrate.

16. The near-eye display device according to claim 15, further comprising:
a convex lens between the layer where the infrared light source is located and a layer where the slit grating is located,
wherein an orthographic projection of the convex lens on the base substrate covers the display area and the orthographic projection of the infrared sensor on the base substrate, and the orthographic projection of the convex lens on the base substrate and the orthographic projection of the infrared light source on the base substrate do not overlap each other.

17. A display method of the near-eye display device according to claim 13, comprising:
controlling the infrared light source to emit light;
receiving infrared rays reflected by an eye of a user through the infrared sensor;
collecting an electrical signal of the infrared sensor, and determining a fixation position of the user on the display panel based on the electrical signal of the infrared sensor; and
rendering an image to be displayed corresponding to the fixation position, and providing a rendered image to be displayed to the display panel for display.

* * * * *